United States Patent [19]

Bescoby et al.

[11] Patent Number: 4,896,975
[45] Date of Patent: Jan. 30, 1990

[54] CERAMIC AIR BEARING SHAFT

[75] Inventors: Frank A. Bescoby, Rancho Palos Verdes; David M. Kotchick, San Pedro; Stanley C. Pollitt, Rancho Palos Verdes, all of Calif.

[73] Assignee: Allied-Signal Inc., Morris Township, N.J.

[21] Appl. No.: 283,640

[22] Filed: Dec. 13, 1988

[51] Int. Cl.[4] .............................................. F16C 37/00
[52] U.S. Cl. .................................... 384/114; 384/320; 384/907.1; 384/913; 384/297; 384/277
[58] Field of Search ..................... 384/320, 907.1, 913, 384/114, 297, 277

[56] References Cited

U.S. PATENT DOCUMENTS

| | | |
|---|---|---|
| 2,223,847 | 12/1940 | Engdahl . |
| 2,226,910 | 12/1940 | Rice . |
| 2,323,850 | 7/1943 | Scott . |
| 2,352,206 | 6/1944 | Kendall . |
| 2,356,578 | 8/1944 | Galtney . |
| 2,440,890 | 5/1948 | Birmann . |
| 2,590,761 | 3/1952 | Edgar . |
| 2,627,443 | 2/1953 | Becker . |
| 2,691,814 | 10/1954 | Tait . |
| 2,714,538 | 8/1955 | Hornbostel . |
| 2,788,324 | 4/1957 | Mitchell . |
| 3,140,131 | 7/1964 | Tann . |
| 3,149,819 | 9/1964 | Baumann et al. ................... 384/320 |
| 3,298,753 | 1/1967 | Eaton, Jr. . |
| 3,726,572 | 4/1973 | Beardmore ......................... 384/913 |
| 4,492,518 | 1/1985 | Neal . |
| 4,582,368 | 4/1986 | Fujita et al. . |
| 4,650,777 | 3/1987 | Kurokawa et al. . |

Primary Examiner—Lenard A. Footland
Attorney, Agent, or Firm—David B. Abel; James W. McFarland

[57] ABSTRACT

A ceramic shaft machinery element having an incorporated cooled bearing runner surface providing superior support for the ceramic shaft.

13 Claims, 2 Drawing Sheets

FIG. 1
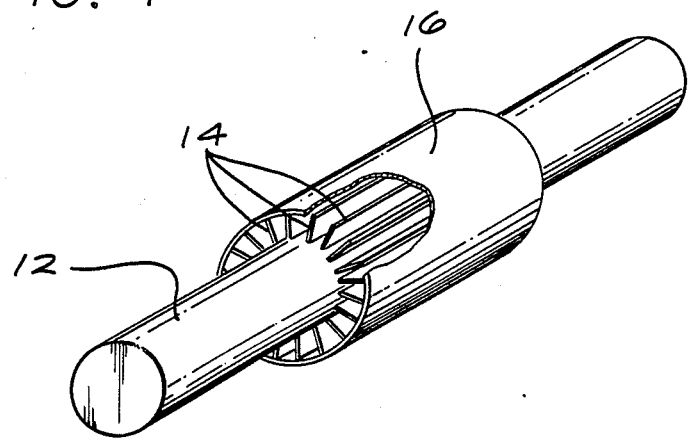
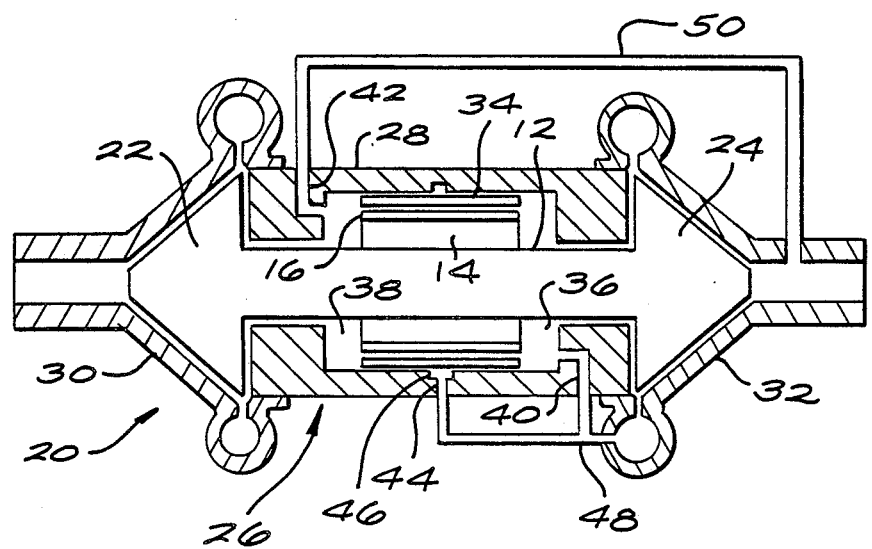
FIG. 2

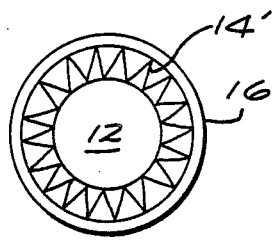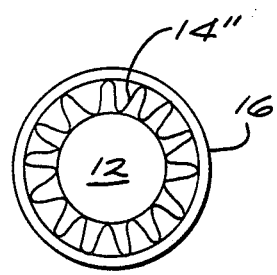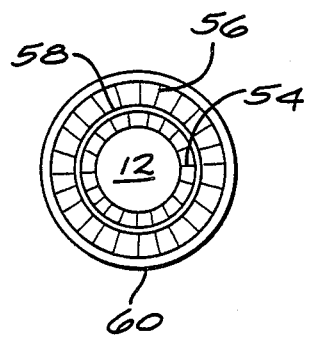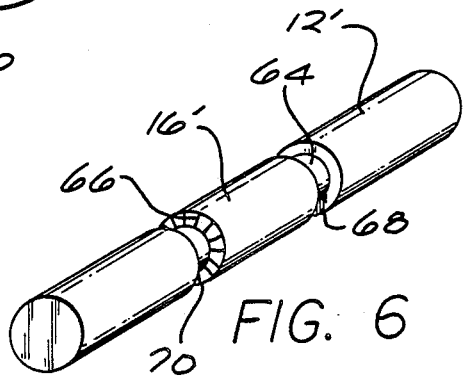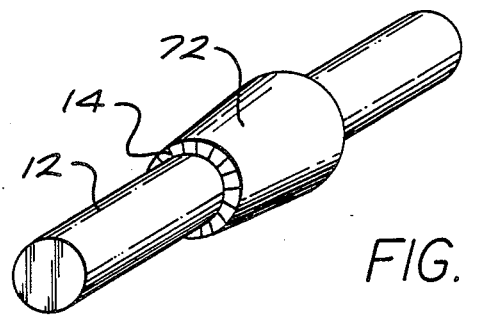

CERAMIC AIR BEARING SHAFT

This invention relates to the field of extreme environment ceramic turbomachinery, and in particular to an apparatus and method for providing a cooled bearing surface for a ceramic shaft, a turbomachine incorporating the ceramic shaft, and a process fluid bearing to support the ceramic shaft.

BACKGROUND OF THE INVENTION

The high temperature resistance and chemically non-reactive properties of ceramics make ceramic components a desirable replacement for traditionally metal components. A particular example of this can be found in the turbomachinery field where ceramic turbine wheels have begun to replace metallic turbine wheels within turbochargers for motor vehicles. Ceramic turbine wheels can operate at higher temperatures, are lower in weight and inertia, and are chemically non-reactive, thus making them superior to their metallic counterparts.

However, ceramics have certain properties which make it difficult to support a ceramic shaft, which for example may extend from a ceramic turbine wheel, with traditional bearing systems such as lubricated ball bearings or journal bearings. In addition, known ceramics capable of operating at very high temperatures are relatively good conductors of heat. When the turbine wheel is formed integral with the shaft, heat is conducted from the turbine wheel along the shaft causing bearing surfaces to become very hot. When these shafts are supported by oil lubricated ball or journal bearings, the high temperature of the shaft may cause coking of the oil. This coking of the bearings will rapidly lead to failure of the turbomachine.

In certain applications, fluid film gas bearings utilizing metal foils to support a shaft on a hydrodynamic film of gas have replaced ball bearings and journal bearings. Example of these types of process fluid bearings, include U.S. Pat. Nos.: 3,893,733; 3,957,317; 4,153,315; 4,178,046, 4,195,395; 4,475,824; 4,502,795; 4,621,930; and 4,624,583.

In the operation of these fluid film gas bearings, at startup and rundown, there is actual contact between the foils and the bearing surfaces. In order to lower startup friction and prevent wearing of the contact surfaces, the foils may be coated with a lubricant material such as a fluorinated hydrocarbon polymer, graphite, or molydenum disulfide. Examples of patents specifically directed to foil coatings are U.S. Pat. Nos.: 3,677,612; 4,005,914; 4,178,046; 4,435,839; and 4,459,047.

These types of fluid bearings would be an ideal match for ceramic shafts except for soak back heating of the shaft from the turbine wheel. The various lubricant materials in use as well as the metal foils are susceptible to damage at elevated temperatures. Heretofore an acceptable bearing support system for a ceramic shaft which is exposed to high temperatures has not been available.

SUMMARY OF THE INVENTION

This invention provides a ceramic shaft having an integral process fluid bearing runner supported by a fin matrix. The bearing runner and fin matrix are formed of a ceramic material having a relatively low co-efficient of thermal conductivity. Thus, the conduction of heat to the bearing runner surface is reduced. Additionally, process fluid or air directed through the fin matrix between the shaft and the bearing runner cools the fin matrix and thereby additionally minimizes thermal conduction to the bearing runner. By this arrangement, the ceramic shaft may be supported by process fluid bearings without exposing the bearings to high temperatures.

BRIEF DESCRIPTION OF THE DRAWINGS

FIG. 1 is a perspective view of a ceramic shaft including the fin matrix and bearing runner of the present invention.

FIG. 2 is a cross sectional view of a turbomachine including the ceramic shaft of FIG. 1.

FIG. 3 is a cross sectional view of the ceramic shaft showing an alternate arrangement for the fin matrix.

FIG. 4 is a cross sectional view of the ceramic shaft showing a second alternate arrangement for the fin matrix.

FIG. 5 is a cross sectional view of the ceramic shaft showing another alternate arrangement for the fin matrix.

FIG. 6 is a perspective view of a ceramic shaft having an incorporated fin matrix and bearing runner.

FIG. 7 shows an alternate embodiment for the bearing runner wherein both axial and radial bearing support is provided.

DETAILED DESCRIPTION OF THE INVENTION

FIG. 1 perspectively shows a ceramic shaft 12 having a plurality of fins 14 extending radially outward from a central portion thereof. A bearing runner 16 in the shape of a thin cylindrical sleeve is mounted at the radially outward ends of the fins 14, bearing runner 16 being axially concentric with the ceramic shaft 12. FIG. 2 shows a cross sectional view of a turbomachine 20 which includes the ceramic shaft 12, fins 14, and bearing runner 16 as an integral member therein. The turbomachine 20 includes a turbine 22 and a compressor 24 attached to opposite ends of the ceramic shaft 12, mounted within a housing 26 which includes a central body 28, a turbine scroll 30, and a compressor scroll 32. The central body 28 contains a fluid bearing 34 mounted therein and positioned radially outward from the bearing runner 16. Annular cavities 36, 38 are defined within the central body at opposite axial ends of the bearing runner 16.

The turbomachine 20 operates on a flow of high pressure fluid which is directed upon the turbine 22 which extracts useful work therefrom. The turbine 22 in turn drives the compressor 24 which pressurizes a fluid from a first low pressure source to a higher pressure. Within the central body 28 the fluid bearing 34 utilizes the rotation of the shaft 12 and bearing runner 16 to produce a hydrodynamic film of fluid between the fluid bearing 34 and the bearing runner 16 to support the shaft 12.

In order to provide a flow of cooling fluid to the matrix of fins 14 as well as the fluid bearings 34, the central body may include first, second and third passageways 40, 42, 44. The first passageway 40 extends through the central body 28 to the annular cavity 36. The second passageway 42 extends through the central body 28 to the annular cavity 38. The third passageway extends through the central body 28 and connects to an annular plenum 46 which distributes air circumferentially about the fluid bearing 34. The first and third passageways 40, 44 are connected via a conduit 48 to a source of pressurized air which may be taken from downstream of the compressor 24. In order to recirculate the process fluid, the second passageway 42 is connected to a second conduit 50 which returns the process fluid to a low pressure location upstream of the compressor 24. By this assembly, pressurized process fluid flows into annular cavity 36, through the fins 14 to annular cavity 38, thereby the fins 14 act as a heat exchanger, reducing heat transfer to the bearing runner 16. Alternatively, the first and third passageways 40, 44 may be open to the atmosphere allowing ambient air to cool the fins 14.

FIGS. 3, 4 and 5 depict alternate fin arrangements for the fins 14. In FIG. 3, the fins 14' are arranged in a triangular shape. In FIG. 4, the fins 14" are formed from a corregated sheet wrapped around the shaft 12. FIG. 5 shows an arrangement including two sets of fins 54, 56. The first set of fins supports an intermediate sleeve 58. The second set of fins extend from the intermediate sleeve 58 to support an outer sleeve 60 which acts as the bearing runner. Within all of these arrangements, the fins 14, 14', 14", 54, and 56 may define a helix about the shaft 12 so as to pump cooling fluid with rotation of the shaft 12.

FIG. 6 is another embodiment of the invention wherein the bearing runner 16' has the same diameter as the major portions of the ceramic shaft 12'; and the ceramic shaft 12' has a stepped section 64 having a reduced diameter. The fin matrix 66 extends from the reduced diameter to the bearing runner 16'. Slots 68 and 70 on opposite ends of the matrix of the fins 66 allow cooling fluid to enter and exit from the matrix of fins 66.

FIG. 7 shows a cross sectional view along the axis of the shaft assembly wherein a bearing runner 72 is conically shaped, such that both axial and radial bearing support may be provided to the ceramic shaft 12.

For all of the above embodiments, the shafts, fins, and bearing runner will all be formed of like materials. Preferred ceramics include Silicon Carbide and Silicon Nitride, however other structural ceramics are also contemplated by the invention. To form the structural elements, selected ceramic particles are mixed with a plasticizer and binder within a mixer. For the shaft 12 as well as the turbine 22, binder and plasticizer in approximately equal amounts having a volume percentage of from approximately 20% to 40% by weight is used. For the fins 14 and bearing runner 16 excess binder or organic filler is incorporated. The green state shafts 12 are then formed by one of the processes including extrusion or slip casting. The green state fins 14 and bearing runner 16 are formed by any of the processes including extrusion or calendering, or alternatively, co-extruded or slip cast simultaneously with the shaft. In the case where the fins 14 and bearing runner 16 are formed separately from the shaft 12, a solvent may be used to enhance the attachment of the fins 14 to the shaft 12 when the bearing runner 16 and fin matrix 14 is either wrapped around or slid over the shaft. The solvent acts to partially dissolve the incorporated binder, which then reforms, binding the fins 14 to the shaft 12 when the solvent vaporizes.

The structure is then processed within a furnace by a binder extraction cycle, followed by a densification cycle. The densification cycle is preferably a reaction bonding process within a nitrogen atmosphere. However, other densification processes including sintering or hot isostatic pressing either exclusively or in any combination of the three methods may be used. In the preferred embodiment, the densification results in the shaft attaining a density greater than 85% of theoretical maximum density and preferably of between from 94% to 100% of theoretical, while the fins and bearing runner attain a density of less than 85% of theoretical. Since the thermal conductivity of ceramics is related to the density, it may be readily appreciated that the themal conductivity of the fins 14 and bearing runner 16 will be less than that of the shaft 12.

It should be evident from the foregoing description that the present invention provides many advantages for ceramic shaft support systems. Although preferred embodiments are specifically illustrated and described herein, it will be appreciated that many modifications and variations of the present invention are possible in light of he above teaching to those skilled in the art. It is expected, therefore, that the present invention be limited only by the appended claims.

I claim:

1. A machinery element comprising:
   a ceramic shaft; and
   bearing surface means attached to said ceramic shaft for providing a cooled bearing support surface, said bearing surface means including fins extending radially outwardly from said shaft, said fins supporting an axially concentric bearing sleeve, said fins and said sleeve formed of a ceramic composite.

2. The machinery element of claim 1 wherein said fins are configured so as to allow gaseous cooling fluid to flow through passageways between said fins with rotation of said shaft.

3. The machinery element of claim 1 wherein said ceramic shaft is a ceramic composite densified to greater than 85 percent of theoretical.

4. The machinery element of claim 3 wherein said ceramic of said fins and said sleeve is a ceramic composite densified to less then 85 percent of theoretical.

5. The machinery element of claim 3 wherein said ceramic composite is densified to from 94 to 100 percent of theoretical.

6. The machinery element of claim 1 wherein said fins define a helix about said shaft to pump cooling fluid with rotation of said shaft.

7. The machinery element of claim 1 wherein said bearing surface means further comprises:
   an intermediate cylindrical sleeve disposed between said ceramic shaft and said bearing sleeve.

8. The machinery element of claim 1 wherein said fins are arranged in a plurality of triangular shapes between said shaft and said bearing sleeve.

9. The machinery element of claim 1 wherein said fins are formed from a corregated sheet wrapped around said shaft.

10. The machinery element of claim 1 wherein said bearing sleeve is cylindrical.

11. The machinery element of claim 1 wherein said bearing sleeve is conical.

12. The machinery element of claim 1 wherein said ceramic shaft has a stepped section having a reduced diameter, said fins extending from said reduced diameter and said bearing sleeve has an outer diameter equal to the diameter of said ceramic shaft.

13. The machinery element of claim 12 wherein both of said ceramic composites are silicon nitride based composites.

* * * * *